United States Patent [19]

Pirl

[11] Patent Number: 5,066,846
[45] Date of Patent: Nov. 19, 1991

[54] SYSTEM AND METHOD FOR LASER WELDING THE INNER SURFACE OF HEAT EXCHANGER TUBES

[75] Inventor: William E. Pirl, Levelgreen, Pa.

[73] Assignee: Westinghouse Electric Corp., Pittsburgh, Pa.

[21] Appl. No.: 543,983

[22] Filed: Jun. 26, 1990

[51] Int. Cl.$^5$ .............................. B23K 26/00
[52] U.S. Cl. .......................... 219/121.63; 219/121.78; 376/260
[58] Field of Search ...................... 219/121.63, 121.64, 219/121.78; 376/260

[56] References Cited

U.S. PATENT DOCUMENTS

| | | | |
|---|---|---|---|
| 4,525,616 | 6/1985 | Slavens | 219/60 R |
| 4,571,475 | 2/1986 | Rabe | 219/60 A |
| 4,736,092 | 4/1988 | Pirl et al. | 219/523 |
| 4,821,943 | 4/1989 | Gaudin et al. | 219/60.2 X |
| 4,827,098 | 5/1989 | Kasner et al. | 219/121.63 |
| 4,839,495 | 6/1989 | Kitera et al. | 219/121.63 |
| 4,841,115 | 6/1989 | Severin et al. | 219/60 A |
| 4,845,330 | 7/1989 | Gaudin | 219/60 A |

Primary Examiner—C. L. Albritton

[57] ABSTRACT

Both a system and method for laser welding the inner surface of a metallic tube, which may be a sleeve inside a heat exchanger tube of a nuclear steam generator, is disclosed. The system comprises an elongated tubular housing that is insertable within a reinforcing sleeve disposed within a heat exchanger tube, a laser unit for generating a beam of light, a fiber optical conduit for conducting light from the laser unit through the interior of the tubular housing, a beam deflection assembly including a mirror canted at an angle of 45° that is rotatably mounted on the distal end of the housing and optically connected to the fiber optical cable, and a remotely powered rotary drive assembly for rotating the beam deflection assembly to direct laser light around the inner surface of the tube that includes a transducer for converting linear to rotary motion. The motion transducer includes a tubular driven member concentrically disposed within said housing and connected to the beam deflection assembly, and a tubular drive member concentrically disposed within the driven member and having a spiral groove around its outer diameter that meshes with a follower ball connected to the inner diameter of the driven tube, such that the driven member rotates whenever the drive member is slidably pulled along the longitudinal axis of the housing. The linear-to-rotational motion transducer obviates the need for miniaturized electrical or pneumatic motors, which in turn allows the outer diameter of the housing of the system to be made small enough to service small-diametered heat exchanger tubes.

23 Claims, 7 Drawing Sheets

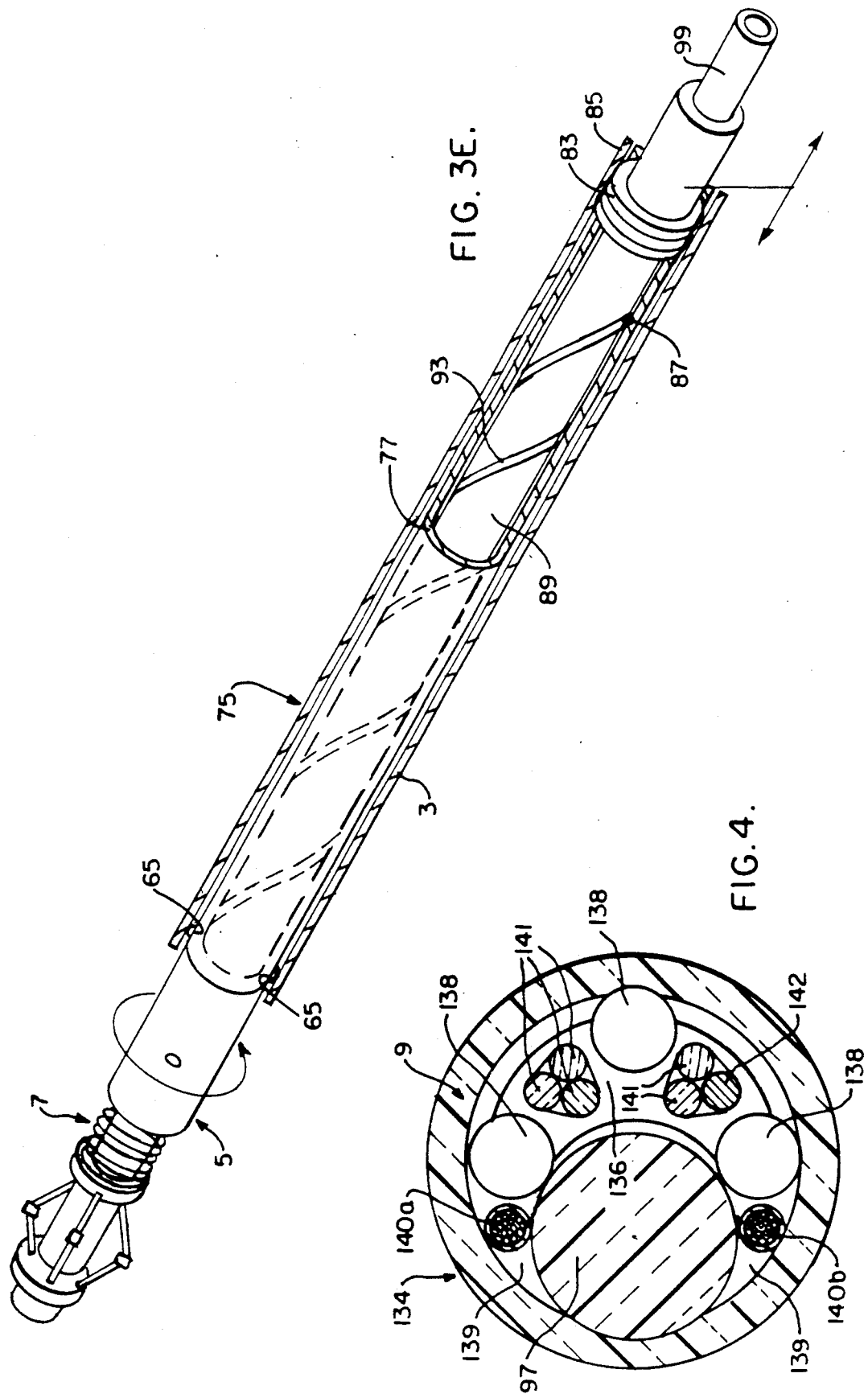

SYSTEM AND METHOD FOR LASER WELDING THE INNER SURFACE OF HEAT EXCHANGER TUBES

BACKGROUND OF THE INVENTION

This invention generally relates to welding systems, and is specifically concerned with a system and method for laser welding a sleeve to the inner surface of a heat exchanger tube in order to repair the tube.

Systems for laser welding sleeves to the inner surfaces of heat exchanger tubes are known in the prior art. Such systems are particularly useful in maintaining the integrity of the heat exchanger tubes used in nuclear steam generators. However, before either the utility or the limitations of such systems can be appreciated, some general background as to the structure, operation and maintenance of nuclear steam generators is necessary.

Nuclear steam generators are generally comprised of a bowl-shaped primary side, a tubesheet disposed over the top of the primary side, and a cylindrically shaped secondary side which in turn is disposed over the tubesheet. Hot, radioactive water from the reactor core circulates through the primary side of the steam generator, while non-radioactive water is introduced into the secondary side. The tubesheet hydraulically isolates but thermally connects the primary side to the secondary side by means of a number of U-shaped heat exchanger tubes whose bottom ends are mounted in the tubesheet. Hot, radioactive water from the primary side flows through the interior of these heat exchanger tubes while the exterior of these tubes comes into contact with the non-radioactive water in the secondary side in order to generate non-radioactive steam.

In the secondary side of such steam generators, the legs of the U-shaped heat exchanger tubes extend through bores present in a plurality of horizontally-oriented support plates that are vertically spaced from one another, while the ends of these tubes are mounted within bores located in the tubesheet. Small, annular spaces are present between these heat exchanger tubes and the bores in the support plates and the tubesheet which are known in the art as "crevice regions". Such crevice regions provide only a very limited flow path for the feed water that circulates throughout the secondary side of the steam generator, which causes "dry boiling", to occur wherein the feed water boils so rapidly that these regions can actually dry out for brief periods of time before they are again immersed by the surrounding feed water. This chronic drying-out causes impurities in the water to precipitate and collect in these crevice regions. These precipitates ultimately create sludge and other debris that promote the occurrence of stress corrosion cracking in the regions of the tubes surrounded by the bores of the tubesheet and the support plates which, if not repaired, will ultimately allow radioactive water from the primary side to contaminate the non-radioactive water in the secondary side of the generator.

To prevent such contamination from occurring, a repair procedure known as "sleeving" has been developed wherein a tubular sleeve formed from the same stainless steel as the damaged heat exchanger tube is slid up within the tube so that is traverses the corroded or otherwise damaged length of the tube. The ends of the sleeve are then affixed to the inner surfaces of the tubes in order to form a hydraulic "bridge" across the corroded or otherwise degraded length of the tube.

In the past, the ends of such sleeves have been affixed around the inner diameters of the heat exchanger tubes by mechanical expansions, brazing, and laser welding. While all three of these techniques have proven themselves to be effective in the field, welding is now thought to be the overall best technique for a variety of reasons. First, a properly-executed weld joint between the outer diameter or a sleeve and the inner diameter of a tube results in the strongest and most leak-proof connection between the tube and the sleeve. Secondly, welding may cause the least amount of adverse metallurgical changes to occur in the Inconel ® forming the tube and the sleeve. By contrast, mechanical expansions require a significant portion of both the tube and the sleeve to be radially and inelastically deformed, thereby work-hardening the metal. Brazing necessitates the application of a large amount of heat over a large section of the sleeve and tube, which can result in adverse changes in the grain structure of the metal in these regions that renders the metal more susceptible to stress corrosion cracking. Brazing can also cause thermal stresses to occur in the tubes as a result of thermal expansion. While there are procedures which satisfactorily relieve such thermally-induced stresses, the use of such stress-relief procedures protracts the time necessary to install the sleeves which is undesirable, since for many utilities the revenue losses associated with any repair procedure exceed over a million dollars per day. Because laser welding techniques are capable of reliably creating a weld joint by the application of laser light along a very thin circle around the inner diameter of the sleeve, adverse changes in the metals forming the sleeve in the tube are minimized to very small localities in the tube. Moreover, the highly localized nature of the heat used to weld the sleeve to the tube minimizes thermal differential expansion, thereby obviating the need for time consuming stress-relief techniques. These advantages in combination with the strength, durability, and leak-proof seal that welding provides makes laser welding the most desirable choice for affixing a sleeve to the inner surfaces of damaged heat exchanger tubes.

Unfortunately, none of prior art laser welding systems that the applicant is aware of is capable of effectively and reliably welding the end of a sleeve that is less than about 0.75 inches in diameter. Applicant has observed that this limitation arises from the unavailability of either electric or pneumatic motors that have diameters smaller than about 0.75 inches but yet which are sufficiently powerful to reliably rotate the 45° mirror used to deflect laser energy around the inner surface of the sleeve. The unavailability of such motors poses a significant limitation to such prior art laser welding systems, as many of the steam generators in need of sleeving operations have heat exchanger tubes whose diameters are less than 0.75 inches. While it may be possible to develop sufficiently powerful motors having smaller diameters than the ones currently available, the cost associated with such customized development would be considerable.

Clearly, what is needed is a laser welding system that is capable of welding sleeves into heat exchanger tubes that are less than 0.75 inches in diameter. Preferably, such a welding system would be inexpensive to construct, and easy and reliable in operation. Finally, it would be desirable if this system could be easily, quickly and remotely positioned within a desired tube to be sleeved by the use of robotic positioning devices already in existence.

SUMMARY OF THE INVENTION

Generally speaking, the invention is both a system and method for laser welding the inner surfaces of conduits, such as the heat exchanger tubes in nuclear steam generators, that avoids or at least ameliorates the aforementioned disadvantages associated with the prior art. The system generally comprises a rotary drive assembly for rotating a beam deflection assembly that directs laser light around the inner surface of the conduit which includes a motion transducer for converting linear movement along the longitudinal axis of the conduit to rotary motion that has a driven member disposed in a tubular housing which is connected to a beam deflection assembly, and an elongated drive member axially movable within the tubular housing. Both the drive member and the driven member are preferably tubular members that are concentrically disposed within said tubular housing, and one of said tubular members includes a helical groove while the other includes a follower disposed in the groove such that when the drive member is slid along the longitudinal axis of the tubular housing, the driven member rotates.

In order to convert the rotational movement of the driven member into a smooth, fine-pitched helical motion that allows the beam deflection assembly to accurately direct a thin laser beam around the inside of the conduit being welded, the driven member includes a threaded portion along a section of its outer diameter which engages a threaded portion present on the inner diameter of the tubular housing.

In order to secure the beam deflection assembly at a desired position along the longitudinal axis of the conduit or tube to be welded, the housing of the system includes a securing assembly having an inflatable bladder that circumscribes a portion of the outer circumference of the housing which is selectively engageable to the inner surface of the conduit whenever the bladder is filled with a pressurized fluid. A pressurized source of shield gas selectively inflates the bladder of the securing assembly in order to both secure the housing within the conduit, and to provide a steady stream of shield gas up through the center of the housing and out through the beam deflection assembly during a welding operation for preventing unwanted corrosion from occurring in the metal forming the conduit or tube.

An eddy current probe is further provided within the tubular housing of the system in order to guide the system operator as to the whereabouts of the housing (and hence the whereabouts of the beam deflection assembly located on the distal end of the housing) along the longitudinal axis of the conduit or tube to be welded. Finally, the system includes a centering assembly attached to the distal end of the beam deflection assembly for concentrically aligning the rotating beam deflection assembly with respect to the inner walls of the conduit or tube to be welded.

In the method of the invention, the housing of the system is slidably inserted into the conduit or tube to be welded. The eddy current probe is used to position the housing so that the beam deflection assembly is disposed adjacent to the section of the conduit or tube where a welding operation is desired. The housing is secured in this position by admitting pressurized shield gas to the inflatable bladder of the securing assembly. Finally, the beam deflection assembly is rotated by slidably moving the drive member contained within the housing in order to rotate the beam deflection assembly attached onto the distal end of the driven member while laser light is conducted to the beam deflection assembly. In the preferred method, the drive member is slidably moved so that the driven member rotates at a rate of between 10 and 25 rpm's.

BRIEF DESCRIPTION OF THE SEVERAL FIGURES

Figure 3A:
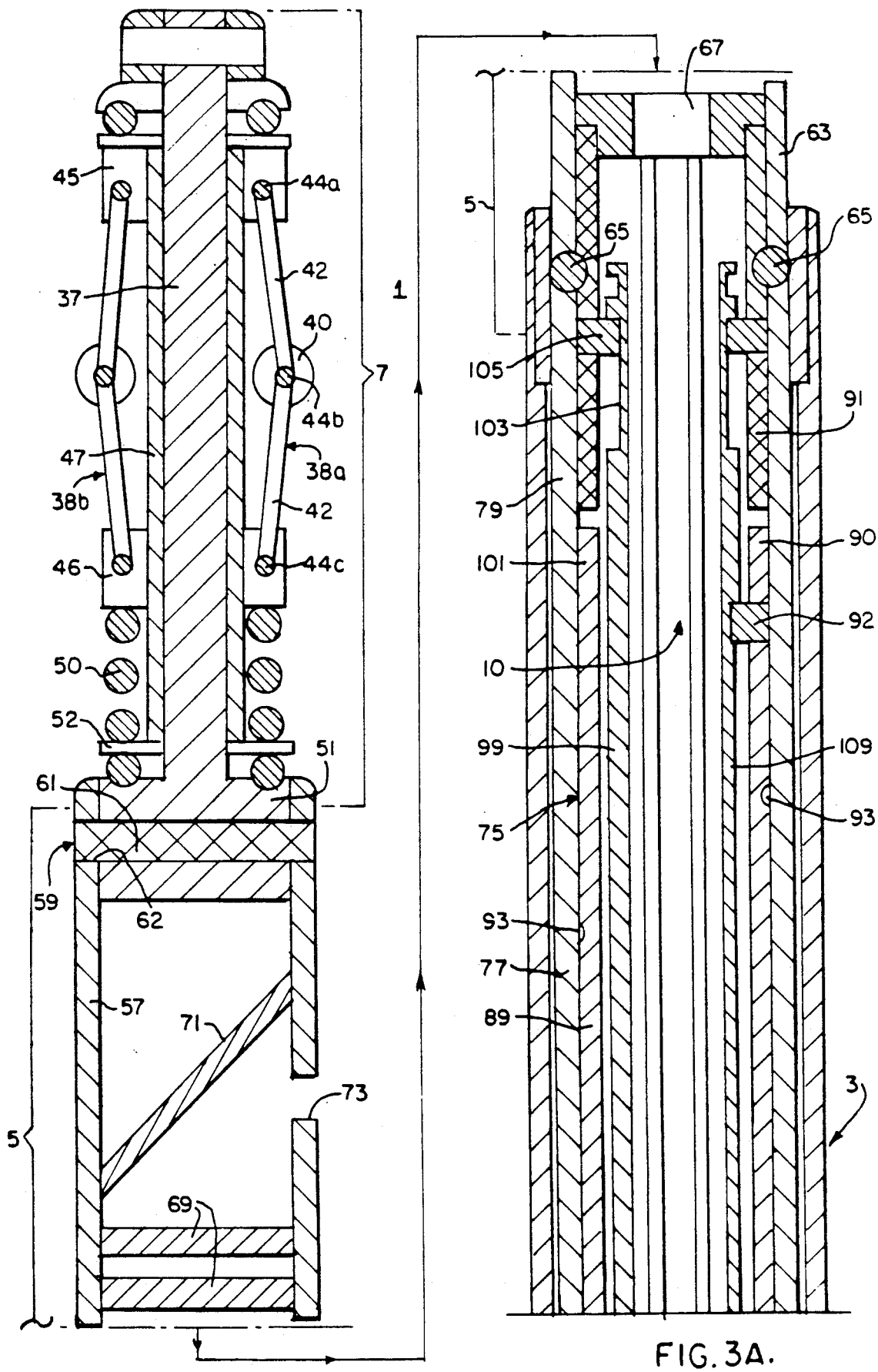
Figure 3B:
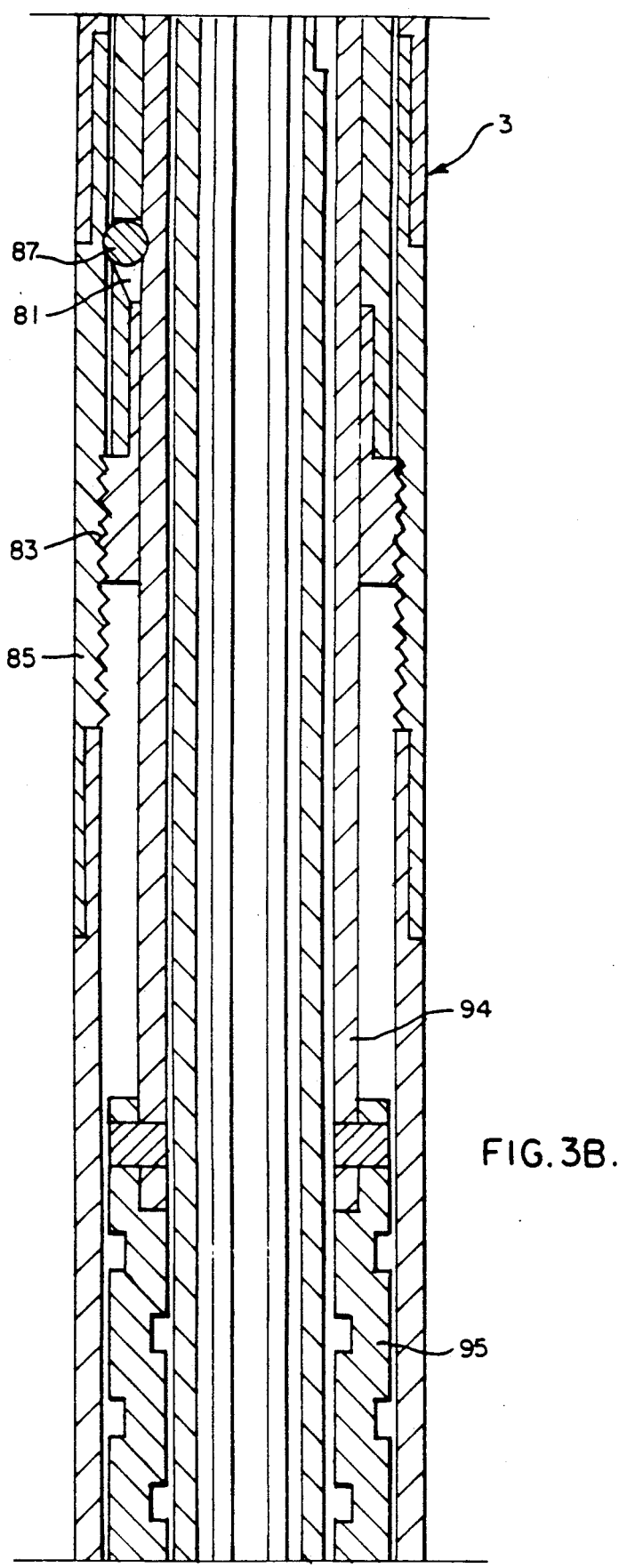
Figure 3C:
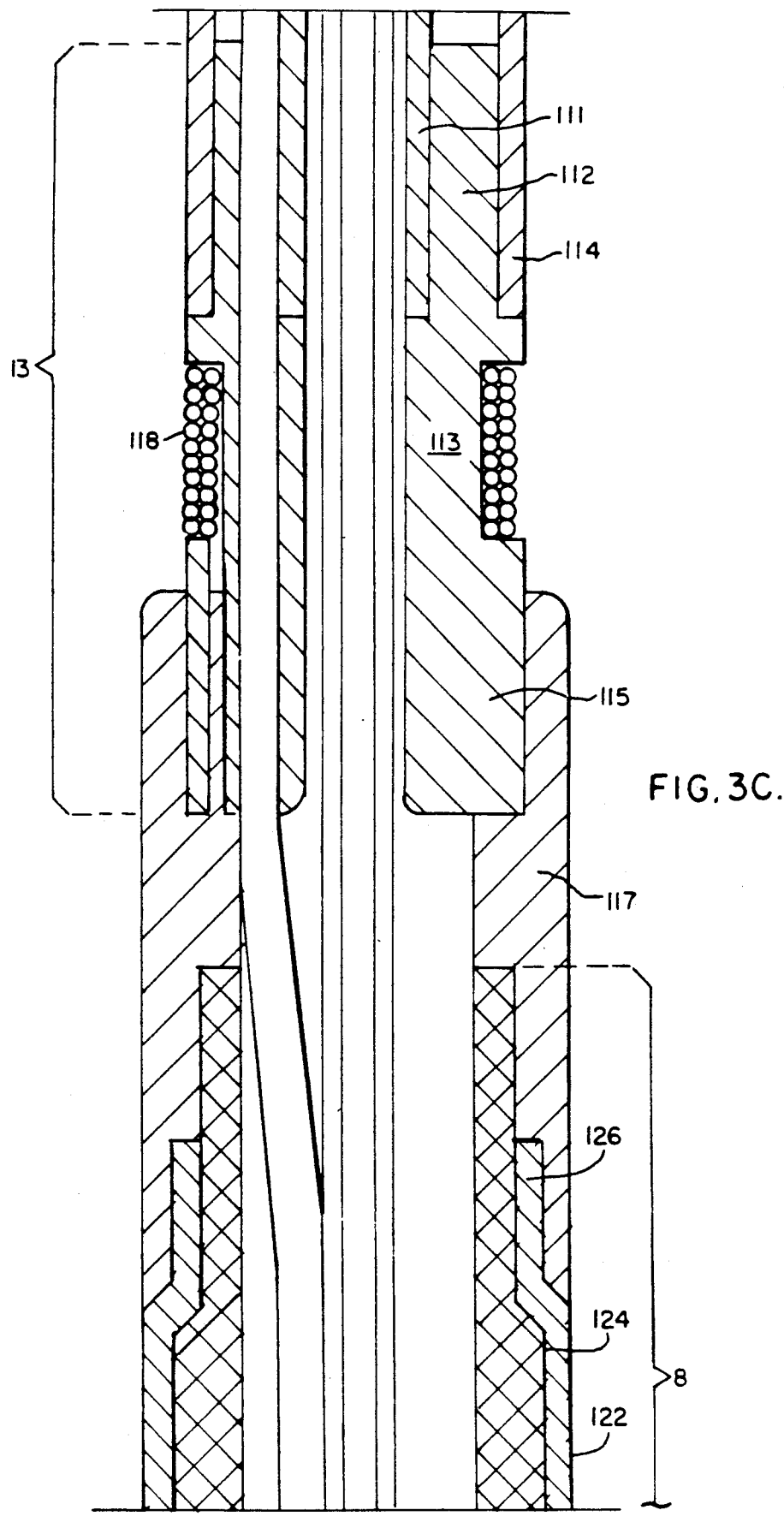
Figure 5:
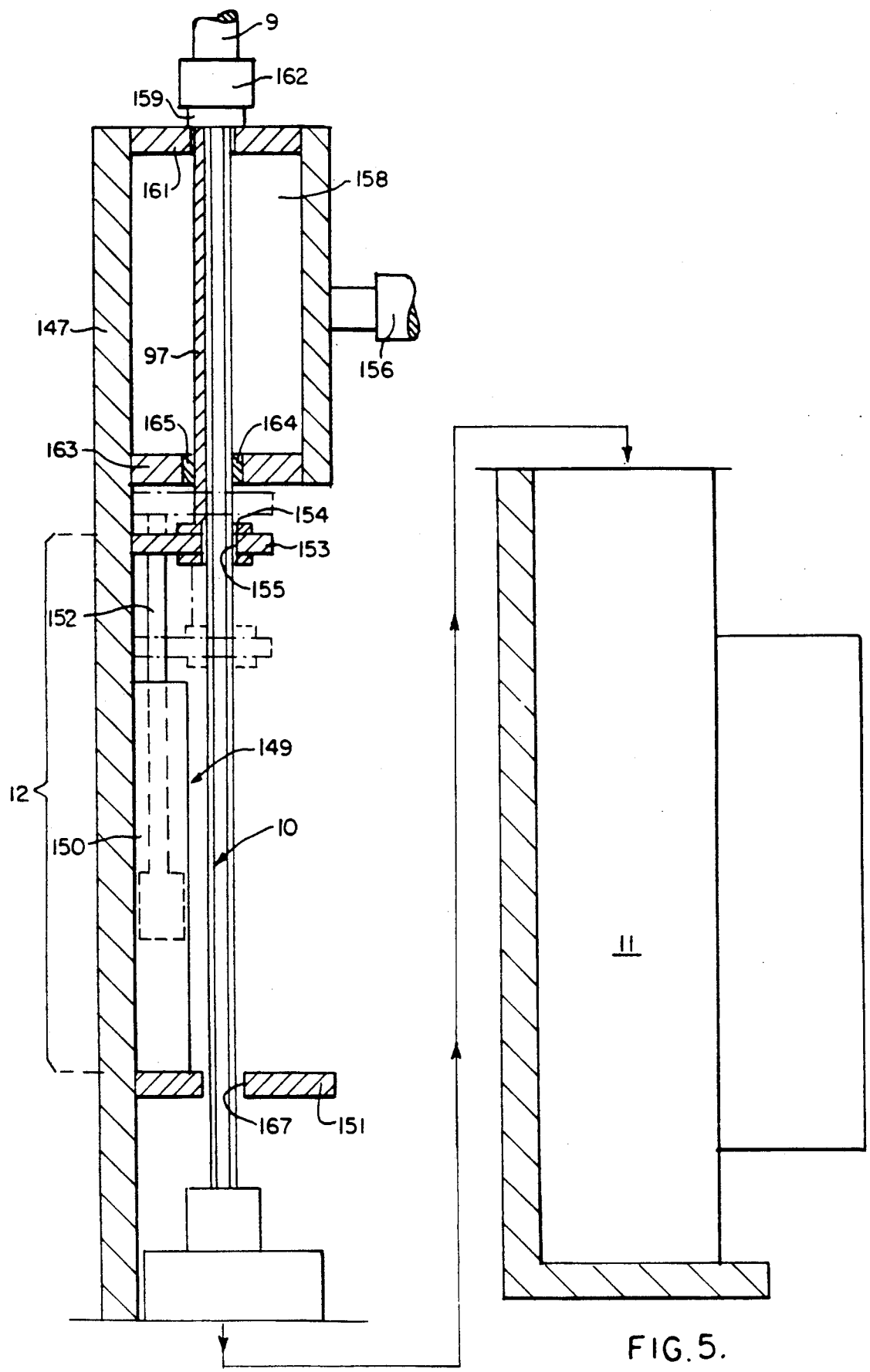

FIGS. 3A, 3B, 3C and 3D form a cross-sectional side view of the housing of the welding system of the invention;

FIG. 3E is a simplified perspective view of the housing illustrated in FIGS. 3A, 3B and 3C, with selected sections of the housing removed in order to illustrate how the drive assembly of the invention converts linear movement of the drive member to rotational motion of the beam deflection assembly;

FIG. 4 is a cross-sectional view of the housing of the welding system taken along the line 4—4 in FIG. 3C, and FIG. 5 is a partial cross-sectional side view of the drive actuator assembly used to power the rotary drive assembly of the invention.

DETAILED DESCRIPTION OF THE PREFERRED EMBODIMENT

Figure 1:
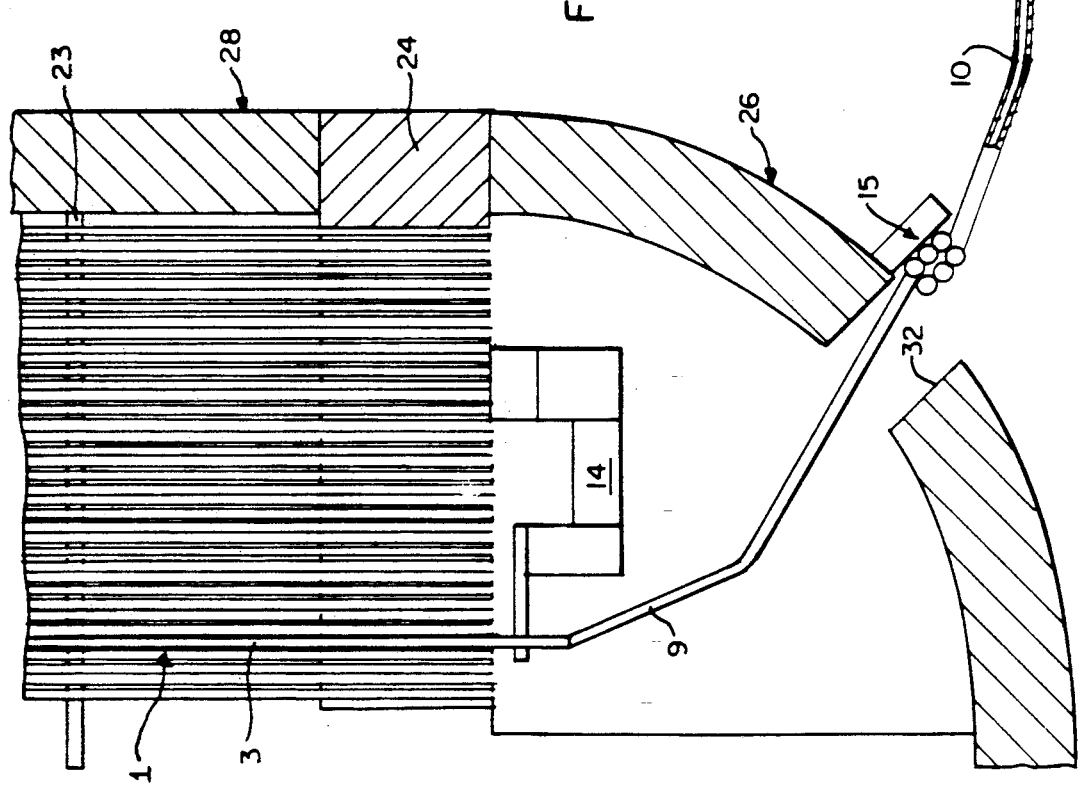
FIG. 1 is a partial, cross-sectional side view of a nuclear steam generator, illustrating how all of the major components of the welding system of the invention would appear when installed in the generator.

With reference now to FIG. 1, wherein like numerals designate like components throughout all of the several figures, the welding system 1 of the invention generally comprises an elongated, tubular welder housing 3 having a beam deflection assembly 5 rotationally connected to its distal end. A centering assembly 7 is connected to the distal end of the beam deflection assembly 5 for maintaining the latter in concentric alignment within the sleeve or tube being welded. A securing assembly 8 is provided near the proximal end of the welder housing 3 for selectively securing the housing at a desired position along the longitudinal axis of the sleeve or tube being welded. A length of flexible tubing 9 is connected onto the proximal end of the welder housing 3 for housing a light conduit 10 formed from a bundle of optical fibers one of which is ultimately connected to a laser light source 11, the balance of which are used to transmit the reflection of laser light from the focusing lenses in the beam deflection assembly 5 to a temperature monitoring device included within the laser unit 11, The flexible tubing 9 serves the additional function of conveying shield gas up through the hollow interior of the welder housing 3 in order to apply a corrosion-impeding, inert gas onto the region of the sleeve or tube being welded by the system 1. A welder delivery device 14 is used to insert and withdraw the welder housing 3 from the open end of a selected heat exchanger tube. In the preferred embodiment, this delivery device 14 may be the ROSA robotic arm developed and manufactured by the Westinghouse Electric Corporation located in Pittsburgh, PA. A pusher-puller assembly 15 is used to extend and retract the flexible tubing 9 as the welder housing 3 is inserted and withdrawn from a selected heat exchanger tube. The pusher-puller assembly 15 may be constructed like the insertion and pusher drive mechanism illustrated in FIGS. 4A and 4B of U.S. patent application Ser. No. 06/802,556 filed Nov. 26, 1985, by R.G. Kelley, Jr. et al. and assigned to the Westinghouse Electric Corporation, the entire specification of which is expressly incorporated herein by reference. Finally, the system 1 includes a source 17 of compressed shield gas, which may be nitrogen. As is indicated in FIG. 1, the shield gas source 17 is connected to the flexible tubing 9 through the drive actuator assembly 12.

Figure 2:
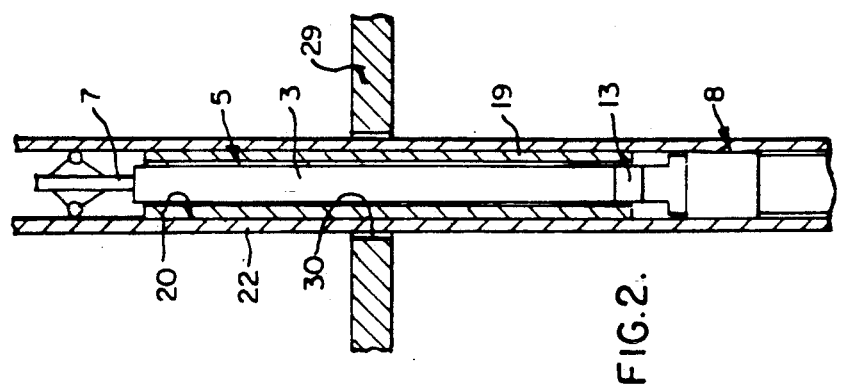
FIG. 2 is an enlargement of the area circled in FIG. 1, illustrating the housing of the welding system disposed within a reinforcing sleeve in a heat exchanger tube in the nuclear steam generator.

With reference now to FIGS. 1 and 2, the welding system of the invention is particularly useful in welding tubular sleeves 19 to the interior surfaces 20 of the heat exchanger tubes 22 in a nuclear steam generator 23. Such generators 23 generally comprise a tubesheet 24 that hydraulically isolates the lower, bowl-shaped primary side 26 of the generator 23 from the upper, cylindrically shaped secondary side 28 of the generator 23. The tubesheet 24 includes a plurality of bores through which the lower ends of the heat exchanger tubes 22 extend. The lower ends of each of the tubes 22 are opened, and are secured to the bores of the tubesheet 24 by means of an annular weld (not shown). During the operation of the steam generator 23, hot, radioactive water enters the lower open ends of the heat exchanger tubes 22 and flows upwardly through the interiors of these tubes 22 in order to heat non-radioactive water which is introduced into the secondary side 28 of the generator 23.

As is best seen with reference to FIG. 2, each of the heat exchanger tubes 22 are further laterally supported throughout the length of the secondary side 28 of the steam generator 23 by a series of support plates 29. Each of these support plates 29 includes a plurality of bores 30 through which the heat exchanger tubes 22 extend. As is evident in FIG. 2, an annular clearance exists between the bores 30 and the support plates 29, and the exterior surface of the heat exchanger tubes 22. Over a long periods of time, sludge and other debris accumulates in these annular spaces due to a combination of poor circulation of the ambient water through the space, and localized boiling. This sludge and other debris can promote the occurrence of stress corrosion cracking in the section of the heat exchanger tubes 22 surrounded by the bores 30 and the support plates 29. If the heat exchanger tubes 22 are allowed to crack in these regions before the installation of reinforcing sleeves 19, hot, radioactive water from the primary side 26 of the generator 23 can flow through the walls of the tubes 22 and contaminant the non-radioactive water that surrounds these tubes 22 in the secondary side 28 of the generator 23. The purpose of the welding system 1 of the invention is to secure such sleeves 19 in place against the interior surface 20 of the heat exchanger tube 22 as quickly and as reliably as possible. As will be described in more detail hereinafter, the welding system 1 is capable of remotely performing such welding operations through the manways 32 located in the primary side 26 of the generator 23.

With reference now to FIG. 3A, the centering assembly 7 of the system 1 is generally formed from a support shaft 37, and three roller linkages 38 disposed around the shaft 37 approximately 120° from one another. Each of the roller linkages 38 includes a centering roller 40 in its midsection which is flanked by a pair of link members 42a, b. Connecting pins 44a, b, c connect the link members 42a, b to a sliding ring 46, the centering roller 40, and a guide sleeve 47, respectively. A compression sleeve 50 biases the sliding ring 46 upwardly the fixed ring 45. The compression spring 50 is captured between the sliding ring 46, and an annular shoulder 51 that circumscribes the lower portion of support shaft 37. An anchor washer 42 secures the lower turn of the spring 50 against annular shoulder 51. It should be noted that the centering assembly 7 is similar in structure and operation to the roller assemblies disclosed in U.S. Pat. No. 4,736,092 invented by William E. Pirl and assigned to the Westinghouse Electric Corporation, the entire specification of which is expressly incorporated herein by reference.

With reference to FIG. 3A, the beam deflection assembly 5 is formed from a tubular housing 57 having a distal portion which extends above the elongated, tubular welding housing 3 and a proximal portion which is concentrically disposed within the welder housing 3. The distal end 59 of the tubular housing 57 includes a connector pin 61 which extends through a bore 62 located in the proximal end of the support shaft 37 of the centering assembly 7 to rigidly secure the centering assembly 7 over the top end of beam deflection assembly 5. The proximal end 63 of the tubular housing 57 includes recesses for housing at least four ball bearings 65 which rollingly engage against the inner walls of the distal end of the welder housing 3. An optical coupling 67 is disposed within the tubular housing 57 near the proximal end 63 thereof which in turn is connected to the distal end of the light conduit 10. The optical coupling 67 directs the laser light flowing through the conduit 10 onto a pair of focusing lenses 69a, b, which concentrate this light into a narrow beam which strikes the 45° mirror 71. The mirror 71 in turn deflects this narrow beam of laser light out through a beam port 73 located in the side of the tubular housing 57. As will become evident shortly, the tubular housing 57 rotates with respect to the welder housing 3 so that the beam of laser light emanating through the port 73 can circumscribe the inner wall of a sleeve 19.

With reference now to FIGS. 3A and 3B, a rotary drive assembly 75 operates to rotate the beam deflection assembly 5 with respect to the welder housing 3. To this end, the drive assembly 75 includes a driven tube 77 whose distal end is integrally connected with the proximal end of the tubular housing 57 of the beam deflection assembly 5 and whose proximal end 81 includes a threaded fitting 83 which engages a threaded coupling 85 which forms part of the welder housing 3. Located just above the threaded fitting 83 is a follower ball 87 which is rotatably supported within a bore located in the walls of the driven tube 77. Concentrically disposed within the driven tube 77 is a drive tube 89. The drive tube 89 has a distal end 90 that is located just below a coupler sleeve 91 whose function will become apparent hereinafter. An anti-rotation pin 92 is mounted just below the distal end 90 of the drive tube 89. This pin is slidably received within a slot 109 in an inner support tube 99 which, like the drive tube 89, does not rotate with respect to the tubular welder housing 3 when the rotary drive assembly 75 rotates the beam deflection assembly 5 during the operation of the system 1. As is best seen in FIGS. 3A, 3B, and 3E, a spiral groove 93 circumscribes the outer surface of the drive tube 89 between its distal end 90 and its proximal end 94. In the preferred embodiment, this spiral groove 93 circumscribes the diameter of the drive tube 89 approximately five times. Just below the proximal end 94 of the drive tube 89 is a piston sleeve 95 whose function is to smoothly dampen the motion of the drive tube with respect to the surrounding welder housing 3 when the drive tube 89 is slidably withdrawn along the longitudinal axis of the housing 3. A push-pull cable 97 is further connected to the proximal end of the drive tube 89 through the piston sleeve 95 for the purpose of pulling the tube 89 downwardly through the interior of the welder housing 3.

Concentrically disposed within the drive tube 89 is the previously mentioned inner support tube 99. The distal end 101 of the support tube 99 includes a slot 103 for slidably receiving a retainer pin 105 mounted through the inner wall of the coupler sleeve 91. A much longer slot 109 is provided along the longitudinal axis of the inner support tube 99 below the slot 103. As has been indicated earlier, this longer, second slot 109 slidably receives the anti-rotation pin 92 that is connected to the inner wall of the drive tube 89. The proximal end 111 of the inner support tube 99 is rigidly attached to the distal end 112 of the eddy current probe body 113, which in turn is rigidly connected to the bottom end of the tubular welder housing 3.

The operation of the rotary drive assembly 75 may be best understood with respect to FIG. 3E. When the push-pull cable 97 is pulled by the drive actuator assembly 12, the drive tube 89 is slidably moved downwardly with respect to both the driven tube 77 and the tubular welder housing 3. Because of the engagement between the anti-rotation pin 92 affixed to the inner wall of the drive tube 89 and the slot 109 present along the outer wall of the inner support tube 99, the drive tube 89 cannot rotate as it is pulled longitudinally downwardly with respect to the driven tube 77. However, because of the engagement between the follower ball 87 in the driven tube and the spiral groove 93 present on the outer walls of the drive tube 89, the linear movement of the drive tube 89 causes the driven tube 77 to rotate as the follower ball 87 "rides" the spiral grooves 93 of the drive tube 89. If the driven tube 77 were merely rotatably connected to the inner walls of the tubular welder housing 3, this linear movement of the drive tube 89 would cause the driven tube 77, and hence the beam deflection assembly 5 which is connected thereto, to merely rotate. However, because of the threaded engagement between the fitting 83 on the driven tube 77, and the threaded coupling 85 that forms part of the tubular welder housing 3, this rotational movement is instead converted into a fine-pitched helical motion. Consequently, the beam of laser light emanating through the beam port 73 is guided along a tight spiral path along the inner wall of the sleeve 19 or other conduit being welded such that the light beam covers a sufficient area around this inner wall to create an effective weld joint between the outer wall of the sleeve 19, and the interior surface 20 of the heat exchanger tube 22. It should be noted that the piston sleeve 95 helps to dampen the linear movement of the drive tube 89 down the longitudinal axis of the welder housing 3, which in turn creates a smooth helical movement of the beam deflection assembly 5 with respect to the welder housing 3. The piston sleeve 95 also includes seals to force the shield gas to travel through the center of the housing 3 and out of port 95, instead of out of the sides of the housing 3.

Figure 3D:
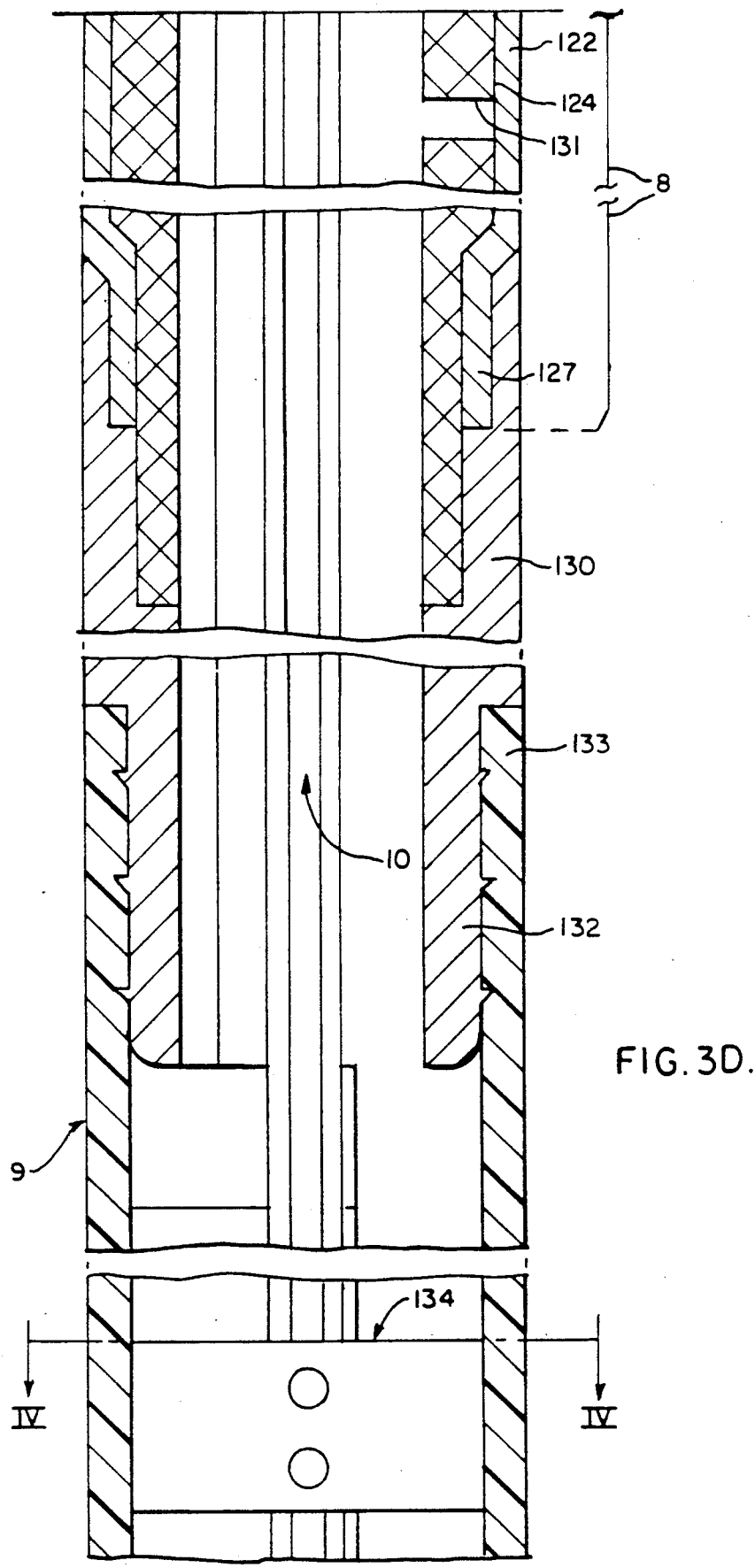

With reference to FIGS. 3C and 3D, the eddy current probe 13 is provided with the previously mentioned probe body 113 which is preferably formed from a non-metallic material, such as Delrin ® or nylon. The distal end 112 of the probe body 113 is screwed into the proximal end 114 of the tubular welder housing 3, as well as the proximal end 111 of the inner support tube 99, whereas the proximal end 115 of the probe body 113 is screwed into a coupling 117 which forms the upper portion of the securing assembly 8. The middle portion of the probe body 113 is circumscribed by a probe coil 118 whose leads are connected to a multifrequency current generator which, in the preferred embodiment, is a MIZ 18 current generator manufactured by Zetec located in Isaquah, Washington. In operation, the eddy current probe 13 is used to precisely locate the top and bottom edges of the support plate 29 near the center of the sleeving operation in accordance with the method set forth in U.S. Pat. No. 4,814,702 invented by John M. Driggers, and assigned to the Westinghouse Electric Corporation, the entire specification which is expressly incorporated herein by reference. The top and bottom edges of the plate 29 are used as reference points in positioning the beam deflection assembly 5 at the end of a sleeve 19.

The securing assembly 8 includes an expandable bladder 122 formed from a sleeve of a resilient plastic material such as polyurethane which circumscribes a cylindrical mandrel 124. The distal end of the bladder 122 is captured between the mandrel 124, and the proximal end of the previously mentioned coupling 117, while the distal end is captured between the proximal end of the mandrel 124, and another coupling 130. This mandrel 124 includes a hollow interior for conducting both the light conduit 10 and the push-pull cable 97, as well as a radially-oriented gas port 131. In operation, when pressurized shield gas in admitted to the distal end of the tubular welder housing 3 through the flexible tubing 9, some of this gas communicates with the inner wall of the flexible bladder 122 through the gas port 131, thereby expanding it into engagement against the interior surface 20 of a heat exchanger tube 22, which in turn secures the welder housing 3 into a desired location along the longitudinal axis of the tube 22. The use of pressurized shield gas to expand the bladder 122 into such a securing engagement advantageously obviates the need for a separate source of pneumatic or other pressurized fluid to accomplish this task. The proximal end 132 of the coupling 130 is circumscribed by a plurality of ridges which help to secure the distal end 133 of the flexible tubing 9 when this tubing is pushed over the coupling and 132 in the position shown in FIG. 3C. The ridges on the coupling end 132 further help to make this connection gas-tight between the tubing 9, and the coupling 130.

With reference now to FIGS. 3C, 3D and 4, the flexible tubing 9 includes a plurality of bearing assemblies 134 for minimizing frictional engagement between the light conduit 10 and the push-pull cable 97 and the inner walls of the tubing 9. Each of the bearing assemblies 134 in turn includes a bearing housing 136 which houses at least three ball bearings 138 that rollingly engage the inner surface of the tubing 9. The bearing housing 136 further includes a crescent-shaped recess through which the push-pull cable 97 extends. The bearings 138 on the periphery on the bearing housing 136 not only help to eliminate friction between the bearing housing 136 and the inner wall of the flexible tubing 9 but further prevent the push-pull cable 97 from coming into frictional engagement with the bearing housing 136.

Gas passages 139 having a roughly triangular shape are defined between the bearings 138 on the periphery of the bearing housing 136, and the body of the push-pull cable 97. These gas passageways 139 allow shield gas to travel easily through each of the bearing assemblies 134 disposed along the longitudinal axis of the flexible tubing 9. Coaxial cables 140a, b extend through the gas passageways 139 in order to bring electrical current to the coil 118 of the eddy current probe 113. Additionally, triangular openings are provided through the bearing housing 136 in order to conduct the optical fibers 141 and the steel reinforcing fiber 142 which together form the light conduit 10. In operation, the bearing assemblies 134 remain fairly stationary within the flexible tubing 9, while the optical fibers 141 and steel fiber 142 which form the light conduit 10, and the coaxial cables 140a, b move only a short distance along the axis of the tubing 9 since they must follow the linear component of the helical movement of the beam deflection assembly 5. By contrast, the push-pull cable 97 moves a longer distance along the longitudinal axis of the flexible tubing 9 and the tubular welder housing 3 to operate the rotary drive assembly 75.

With reference now to FIG. 5, the drive actuator assembly 12 of the system 1 is provided with a retainer bracket 147 onto which a linear actuator 149 is mounted. The linear actuator 149 includes a pneumatic cylinder 150 that is secured onto a rear support flange 151 on the retainer bracket 147. A piston rod 152 is reciprocably movable within the pneumatic cylinder 150, and terminates in an actuator bracket 153 which in turn is connected to a coupling flange 154 that defines the proximal end of the push-pull cable 97. Hence, the push-pull cable 97 is moved linearly along the longitudinal axis of the tubing 9 as the piston rod 152 reciprocates within the pneumatic cylinder 150. By contrast, it should be noted that the light conduit 10 slidably extends through a bore 155 located in the actuator bracket 153 since it does not move the same distance linearly as the reciprocating actuator bracket 153.

A gas conduit 156 that is connected to the source of compressed shield gas 17 is in turn connected onto a nipple 157 that extends out from a shield gas chamber 158 located on the distal end of the retainer bracket 147 as shown. This shield gas chamber 158 is provided with an outlet nipple 159 on its front wall 161 for conducting both the light conduit 10, the push-pull cable 97, and shield gas flowing into the chamber 158 via the inlet nipple 157 up through the flexible tubing 9. A tube coupler 162 connects the outlet nipple 159 to the flexible tubing 9. The rear wall 163 of the shield gas chamber 158 is provided with a bore 164 for again conducting both the light conduit 10, and the push-pull cable 97. A gasket 165 circumscribes the bore 164 to minimize gas losses out of the shield gas chamber 158 as the push-pull cable 97 is reciprocated through this chamber 158. Additionally, the rear support flange 151 located near the middle of the retainer bracket 147 includes a bore 167 for conducting the light conduit 10 to the outlet of the laser unit 11.

In the method of the invention, the manway 32 of the steam generator 23 is opened, and the welder delivery device 14 is installed on the underside of the tubesheet 24 of the generator 23 is shown, while the pusher-puller assembly 15 is installed on a support bracket just outside of the manway 32. The system operator feeds the tubular welder housing 3 through the pusher-puller assembly 15 where it can be grasped by the welder delivery device 14, which is capable of remotely inserting the tubular welder housing 3 into the open end of a selected heat exchanger tube 22. The welder housing 3 is inserted into the open end of a tube 22 into which a sleeve 19 has already been delivered. The beam deflection assembly 5 is properly positioned with respect to one of the ends of the sleeve 19 by moving the tubular welder housing 3 up and down within the heat exchanger tube 22 while using the eddy current probe 13 to detect the presence of the support plate 29 which the sleeve 19 traverses. Since the system operator knows the precise distance between the beam port 73 of the beam deflection assembly 5 and the coil 118 of the eddy current probe 13, it is a simple matter for the system operator to lower the beam deflection assembly 5 into a proper position with respect to one of the ends of the sleeve 19 once the eddy current coil 118 detects the edges of the support plate 29 that the sleeve 19 traverses. Alternatively, the eddy current coil 118 may be used directly to detect the ends of the sleeve 19.

After the delivery device 14 has properly positioned the tubular welder housing 3 within the heat exchanger tube 22, the system operator opens a valve (not shown) which allows pressurized shield gas from source 17 to enter the shield gas chamber 158 of the drive actuator assembly 12. This gas flows up through the flexible tubing 9, and expands the bladder 122 of the securing assembly 8 into engagement against the inner surface 20 of the heat exchanger tube 22. Once the welder housing 3 has been secured into the proper position within the heat exchanger tube 22, the system operator simultaneously actuates the laser unit 11 and the linear actuator 149 of the drive actuator assembly 12. This, of course, has the effect of rotating the beam deflection assembly 5 into a fine-pitched, helical path while a laser beam emanating through the beam port 73 welds one of the ends of the sleeve 19 to the interior surface 20 of the tube 22. In the preferred method of the invention, the linear actuator 149 rotates the beam deflection assembly 5 at a rate of approximately 10 to 20 rpm's.

After one end of the sleeve 19 is so welded, the tubular welder housing 3 is repositioned by cutting off the supply of pressurized shield gas to the shield gas chamber 158 in order to relax the bladder 122 of the securing assembly 8, and by using the welder delivery device 14 and the eddy current probe 13 to place the beam deflection assembly 5 adjacent to the unwelded end of the sleeve 19. The method is then repeated so that both ends of the sleeve 19 are welded to the interior surface 20 of the tube 22.

I claim:

1. A system for laser welding the inner surface of a conduit, comprising:
    an elongated tubular housing having a distal and a proximal end;
    a laser source for generating light energy;
    a light conduit for conducting light energy generated by the laser source through said tubular housing;
    a beam deflection assembly rotatably mounted on the distal end of said housing and optically connected to said light conduit for directing said light energy to the inner surface of the conduit, and
    a rotary drive assembly for rotating said beam deflection assembly to direct said light energy around the inner surface of the conduit, including a motion transducer for converting linear movement parallel to the longitudinal axis of the housing to rotary motion, said transducer having a driven member including a follower means disposed in said housing and connected to said beam deflection assembly, and an elongated drive member axially movable within said housing that includes a helical groove that receives said follower means.

2. A system as defined in claim 1, wherein said driven member and said drive member are tubes concentrically disposed within said housing.

3. A system as defined in claim 1, wherein said motion transducer further includes means for preventing said drive member to rotate relative to said housing.

4. A system as defined in claim 1, wherein said motion transducer further includes a cable means connected to a piston means that is in turn connected to said drive member for smoothly axially moving said drive member within said housing.

5. A system as defined in claim 1, wherein said driven member is threadedly engaged to said housing so that the rotary motion imparted to said driven member by said drive member is a helical rotary motion which causes the light energy directed out of said beam deflection assembly to move axially along the inner surface of the conduit as well as around the perimeter of the inner surface.

6. A system as defined in claim 1, further comprising means for detachably securing said elongated tubular housing within said conduit.

7. A system as defined in claim 6, wherein said securing means includes an inflatable bladder circumscribing a portion of the outer circumference of said housing that is engageable to the inner surface of the conduit.

8. A system as defined in claim 1, further comprising a probe means connected to said housing for detecting the presence of a metallic body around the conduit to be welded.

9. A system for laser welding the inner surface of a metallic tube, comprising:
    an elongated tubular housing insertable within said tube having a distal end and a proximal end;
    a laser source for generating a beam of light;
    a light conduit for conducting said laser generated beam of light through the interior of said tubular housing;
    a beam deflection assembly rotatably mounted on the distal end of said housing and optically connected to said light conduit for directing said light beam onto the inner surface of the tube, and
    a rotary drive assembly for rotating said beam deflection assembly to direct said light energy around the inner surface of the tube, including a motion transducer having a drive member including a follower disposed in said housing and connected to said beam deflection assembly, and an elongated drive member axially movable within said housing that includes a helical groove that receives said follower means for rotating said driven member whenever said drive member is axially moved, wherein said driven member and said drive member are tubes concentrically disposed within said housing, said driven member being rotatably connected to said housing and said motion transducer further including means for preventing said drive member from rotating relative to said housing when said drive member is axially moved within said housing.

10. A system for laser welding as defined in claim 9, wherein said driven member is threadedly engaged to said housing so that the rotary motion imparted to said driven member by said drive member is a helical rotary motion which causes the light energy directed out of said beam deflection assembly to move axially along the inner surface of the conduit as well as around the perimeter of the inner surface.

11. A system for laser welding as defined in claim 9, wherein said light conduit includes a fiber optic cable disposed in the interiors of said tubular driven member and drive member.

12. A system for laser welding as defined in claim 9, wherein said beam deflection assembly includes a focusing means for focusing light transmitted out of the distal end of said light conduit, and a mirror means for reflecting said focused light onto the inner diameter of said tube.

13. A system for laser welding as defined in claim 9, further comprising securing means for detachably securing said elongated tubular housing within said tube including an inflatable bladder circumscribing a portion of the outer circumference of said housing.

14. A system for laser welding as defined in claim 13, further comprising a source of pressurized shield gas, and wherein said housing includes a passageway for conducting said shield gas from its proximal end to an area of welding activity located near its distal end.

15. A system for laser welding as defined in claim 14, wherein said bladder of said securing means communicates with said source of pressurized shield gas such that said gas selectively expands said bladder into gripping engagement with the inner surface of said tube.

16. A system for laser welding as defined in claim 9, further comprising a centering means for centering said beam deflection assembly along the axis of rotation of said tube.

17. A system for laser welding the inner surface of a metallic tube, comprising:
    an elongated tubular housing insertable within said tube and having a distal end and a proximal end;
    a laser source of generating a beam of light;
    a light conduit for conducting said laser generated beam of light through the interior of said tubular housing;
    a beam deflection assembly rotatably mounted on the distal end of said housing and optically connected to said light conduit for directing said light beam onto the inner surface of the tube, and
    a rotary drive assembly for rotating said beam deflection assembly at a rotational speed of between 10 and 30 rpm to direct said light energy around the inner surface of the tube a plurality of times, including a motion transducer having a driven tube concentrically disposed within said housing and connected to said beam deflection assembly, and a drive tube axially movable and likewise concentrically disposed within said housing, wherein said drive tube includes a helical groove that circumscribes its outer diameter a plurality of times, while said driven tube includes a groove follower means disposed in said groove such that axial movement of said drive tube rotates said driven tube relative to said housing.

18. Method for welding the inner circumference of a metallic tube by means of a laser beam deflection assembly rotatably connected to the distal end of an elongated tubular housing that contains a rotary drive assembly having a driven member connected to said beam deflection assembly, and a drive member mechanically linked to said driven member whose axial movements along the longitudinal axis of the housing cause said driven member to rotate, comprising the steps of:

slidably inserting the elongated tubular housing into a tube to be welded;

conducting a beam of laser light to said laser beam deflection assembly, and rotating said beam deflection assembly at a speed of at least 10 rpm by remotely and axially moving said drive member relative to said housing.

19. Method for welding as defined in claim 18, wherein said beam deflection assembly is rotated at a speed of between 8 and 30 rpm.

20. Method for welding as defined in claim 18, wherein said beam deflection assembly is axially moved along the inner surface of the tube at the same time it is rotated.

21. Method for welding as defined in claim 18, further comprising the step of centering the beam deflection assembly with respect to the axis of rotation of the tube prior to the step of conducting laser light to said assembly.

22. Method for welding as defined in claim 18, further comprising the step of detachably securing the elongated tubular housing within said tube so that said beam deflection assembly is adjacent to an area of the inner surface of the tube to be welded.

23. Method for welding as defined in claim 18, further comprising the step of conducting a flow of shield gas through said housing and onto the area of the tube being welded.

* * * * *